Nov. 30, 1954  E. S. LYNCH  2,695,473
PLATE SUSPENDING DEVICE
Filed Sept. 15, 1949
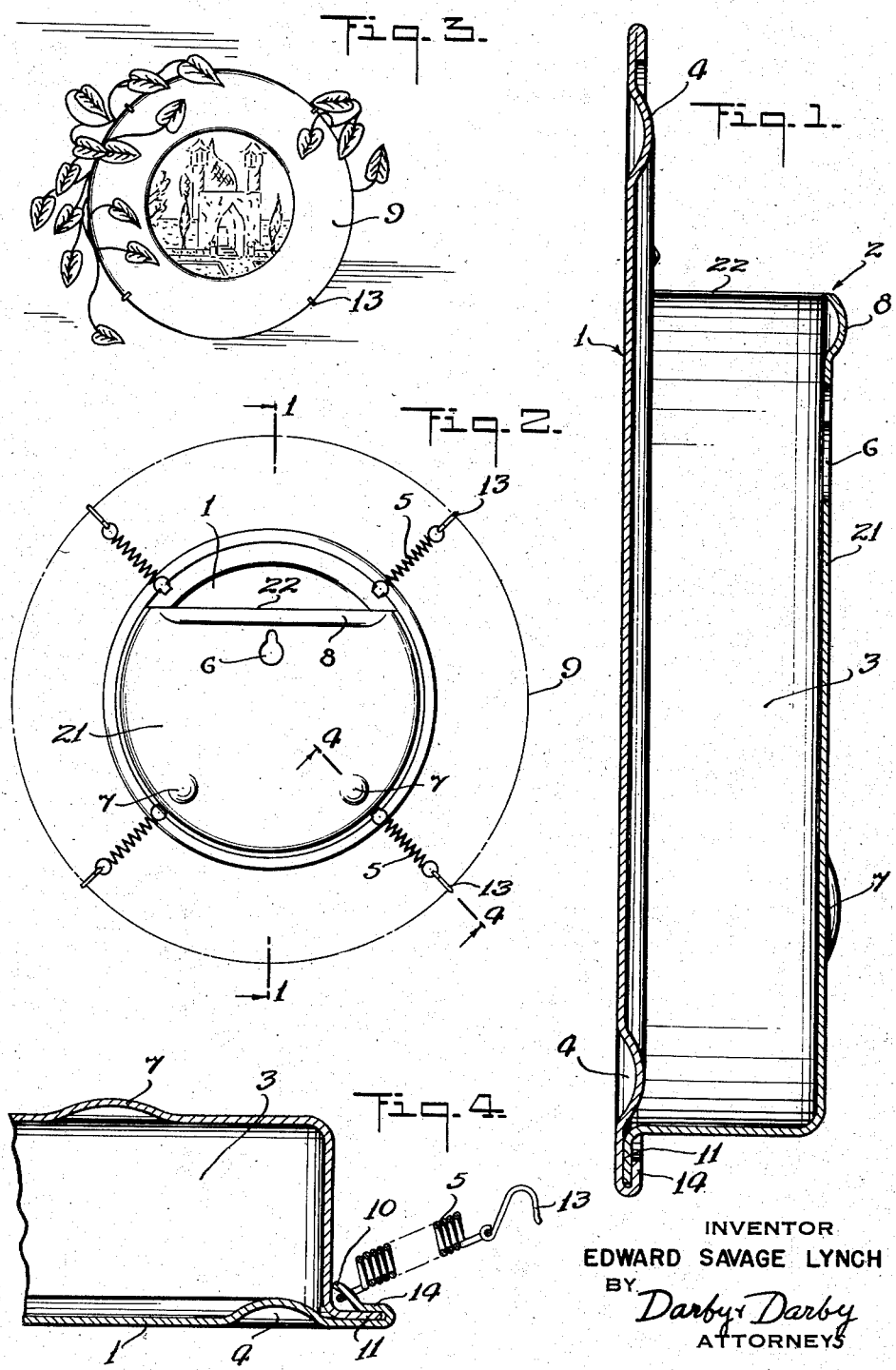
INVENTOR
EDWARD SAVAGE LYNCH
BY Darby & Darby
ATTORNEYS

United States Patent Office 2,695,473
Patented Nov. 30, 1954

2,695,473
PLATE SUSPENDING DEVICE

Edward Savage Lynch, Bronxville, N. Y.

Application September 15, 1949, Serial No. 115,808

2 Claims. (Cl. 47—35)

This invention relates to a device for suspending ornamental plates and the like on a wall and also having in conjunction therewith a receptacle for growing plants, vines, or other foliage.

It is the object of this invention to provide a handy and decorative combined device both for retaining and suspending ornamental plates on a wall or any structure desired to be decorated and for receiving growing plants or the like.

It is a further object of this invention to provide a combined suspension device for ornamental plates and receptacle for plants or the like which is easily and readily adjustable to retain and suspend plates of varying sizes.

Additionally, it is an object of this invention to provide a combined suspension device for retaining and suspending ornamental plates and receptacle for plants or the like which will insure steadfast retention and suspension of said suspended plates.

Further this invention discloses a suspension device for retaining and suspending ornamental plates and the like which is adapted to retain and permit growing of suitable flowers or plants so as to additionally beautify said ornamental plate.

It is also an object of this invention to provide a combined plate-suspending and plant-receiving device which may be easily and handily suspended on and removed from a wall structure and the like.

Further and more specific objects of this invention will become apparent when considered in connection with the annexed drawing, of which:

Figure 1 is a cross-sectional side view of the combined plate suspension and planter device showing the plant retainer section.

Figure 2 shows a back view of the combined plate suspension and planter device showing an ornamental plate retained thereon.

Figure 3 is a front view of the combined plate suspension and planter device showing an ornamental plate retained thereon and a plant growing thereabout.

Figure 4 is a fragmentary cross-sectional side view of the combined plate suspension and planter device showing the hooked springs affixed thereto.

As shown in Figure 1, in the preferred form the present invention is formed of two portions, a front piece 1 and a smaller back piece 2. The back piece 2 has a generally flat back wall 21 of generally circular shape, but having a chordal segment removed at the top to form a straight top edge 22. The back piece 2 also has a generally cylindrical side wall 3 having a flanged edge 11 parallel to back wall 21. The back wall 21, side wall 3, and flanged edge 11 are preferably formed integrally, although they can be separately fabricated and assembled together, where desired.

The larger front portion 1 is circular in shape, being provided with a groove 4 near its circumference providing additional rigidity. The front piece 1 is secured in watertight fashion to the back piece 2 by having the outer edge of the front piece 1 bent around the flanged edge 11 of the back piece 2, as shown at 14. The pieces may then be held together merely by their being thus pressed together, or they may additionally be welded or sealed, where desired. A hole 6 (Fig. 2) is provided in the back wall 21 and permits wall suspension of the device on a nail, hook or the like.

Slight protuberances or "dimples" 7 are provided on the lower portion of the back wall 2. Also a protruding ledge 8 is formed at the edge 22 of the back piece 2. These protuberances 7 and the ledge 8 serve to keep the device from being wholly flush against the wall from which it is hanging and thus allows ready removability when desired.

For mounting an ornamental plate on the device of the present invention, several hooked springs 5 are provided, illustratively shown as four in number, although three or other numbers may be used. These springs 5 are conventional coiled tension springs, each being looped at one end to a corresponding tab 10, which may be struck out of or fixed to the back side of bent over portion 14 of the front piece 1. Each spring 5 is also coupled to a hook 13 at its outer end.

In mounting the plate on the device, the springs 5 are extended until the hooks 13 engage the edge of the plate. The tension of the springs is then sufficient to keep the plate and suspension device together. By the use of the hooked springs it is readily seen that the suspending device is adaptable for use with plates of varying sizes.

The groove 4 in the front piece 1 circumscribes the entire circumference of the disc near its edge and serves to retain the ridge of the base section of an ornamental plate of corresponding size. This, along with the hooked springs, assures steadfast retention of the ornamental plate by the suspending device.

The front piece 1 together with the back wall 21 and side wall 3 of the back piece 2 form a suitable watertight retainer in which growing plants or flowers can be kept. Either water or soil or other necessary growing medium can be supplied as desired.

As may be seen in Figure 3, upon proper growth, the plants or flowers will extend from behind the plate, and may tend to drape themselves over the plate, thus providing an appealing and decorative ornament. The necessity of a separate planter is thus avoided, and the ornamental effect of the decorative plate is enhanced.

The device is best made of metal or a suitable plastic to permit retention of water or liquid plant food. Though not as desirable, wood or similar material may be utilized.

While in the above embodiment of the invention the plate has been shown as secured to the device by the springs 5, it will be understood that the invention is not limited thereto, but other forms of securing means may be used, where desired. Also, although the form of the front and back pieces has been shown as circular, other shapes may be used, such as square, rectangular, hexagonal, or many others.

Furthermore, although the device has been shown as providing a mount for decorative plates, under some circumstances the device may be hung from a wall without any plate. Where this is done, the springs 5 may be omitted. The front plate 1 may be made larger whenever desired, and may be decoratively ornamented. Also, its shape need have no relation to that of the receptacle, whose back and side walls may be fixed to the front plate in any desired manner.

It will also be understood that, instead of hanging the invention on a wall or the like, it may be provided with suitable legs or brackets, permitting it to rest on a flat surface, such as a table or the like.

While I have described a preferred form of my invention it is to be realized that there are many variations possible without departing from the scope of this invention. Consequently, I do not wish to be limited to the foregoing description but solely by the claims granted me.

What I claim is:

1. A combined planter and suspending device for an ornamental table plate or the like, comprising a first generally flat and circular member, a second integral member having a substantially flat wall portion in the form of a circular disc with a chordal segment removed and having an integral cylindrical wall portion extending perpendicularly to said flat wall portion at the circularly arcuate edge thereof, said cylindrical wall portion being joined at its periphery to the edge of said first circular member in watertight fashion to form a plant receptacle, said first member having a plurality of integral tongues struck up therefrom about its periphery and adjacent said cylindrical wall portion, a respective spring having one end secured to each said tongue and having a plate-engaging hook at the other end adapted to engage a table plate for supporting the same by said springs and hooks, said flat circular member having a concentric circular groove formed therein, and said flat wall portion having means for suspending said device and also having a plurality of protuberances formed therein for spacing said device from a wall on which it may be suspended.

2. A combined planter and suspending device for an ornamental table plate or the like, comprising a first generally flat and circular member, a second integral member having a substantially flat wall portion in the form of a circular disc with a chordal segment removed and having an integral cylindrical wall portion extending perpendicularly to said flat wall portion at the circularly arcuate edge thereof, said cylindrical wall portion being joined at its periphery to the edge of said first circular member in water-tight fashion to form a plant receptacle, said first member having a plurality of integral tongues struck up therefrom about its periphery and adjacent said cylindrical wall portion, a respective spring having one end secured to each said tongue and having a plate-engaging hook at the other end adapted to engage a table plate for supporting the same by said springs and hooks, said flat circular member having a concentric circular groove formed therein.

References Cited in the file of this patent

UNITED STATES PATENTS

| Number | Name | Date |
|---|---|---|
| 48,171 | Gunther | June 13, 1865 |
| 1,673,531 | Roedding | June 12, 1928 |
| 2,404,430 | Brooks | July 23, 1946 |
| 2,448,077 | Brooks | Aug. 31, 1948 |
| 2,488,147 | Theissen | Nov. 15, 1949 |
| 2,488,243 | Schneir | Nov. 15, 1949 |
| 2,508,841 | Schreibman | May 23, 1950 |

FOREIGN PATENTS

| Number | Country | Date |
|---|---|---|
| 71,209 | Norway | Oct. 28, 1946 |

OTHER REFERENCES

Annual Report of the Commissioner of Patents for the Year 1865, vol. 1, page 431.